United States Patent
Brandt et al.

(10) Patent No.: US 8,999,029 B1
(45) Date of Patent: Apr. 7, 2015

(54) FURNACE FILTER BOX AND METHOD OF ASSEMBLY

(71) Applicants: Steve Brandt, Westminster, CO (US); James C. Walters, Westminster, CO (US)

(72) Inventors: Steve Brandt, Westminster, CO (US); James C. Walters, Westminster, CO (US)

(*) Notice: Subject to any disclaimer, the term of this patent is extended or adjusted under 35 U.S.C. 154(b) by 76 days.

(21) Appl. No.: 13/667,286

(22) Filed: Nov. 2, 2012

(51) Int. Cl.
*B01D 46/10* (2006.01)
*B01D 46/00* (2006.01)
*B01D 46/16* (2006.01)

(52) U.S. Cl.
CPC ............ *B01D 46/0006* (2013.01); *B01D 46/10* (2013.01); *B01D 46/0002* (2013.01); *B01D 46/16* (2013.01)

(58) Field of Classification Search
CPC ............... B01D 46/10; B01D 46/0005; B01D 2265/028; B01D 46/521; B01D 46/00; F24F 13/28
USPC ........... 55/483, 484, 478, 480, 481, 506, 491, 55/493, 497, 500, 511, 521, DIG. 12, 55/DIG. 31
See application file for complete search history.

(56) References Cited

U.S. PATENT DOCUMENTS

| | | | | |
|---|---|---|---|---|
| 4,171,210 A * | 10/1979 | Miller | ............................. | 55/481 |
| 4,701,196 A * | 10/1987 | Delany | ............................. | 55/481 |
| 7,364,602 B2 * | 4/2008 | Wu et al. | ............................. | 55/493 |
| 7,537,630 B2 * | 5/2009 | Schuld et al. | ............................. | 55/496 |
| 8,388,714 B2 * | 3/2013 | Kearsley | ............................. | 55/378 |
| 2003/0159415 A1 * | 8/2003 | Parker | ............................. | 55/481 |
| 2010/0101197 A1 * | 4/2010 | Livingstone et al. | ............................. | 55/356 |
| 2013/0205732 A1 * | 8/2013 | Gillilan | ............................. | 55/497 |

* cited by examiner

*Primary Examiner* — Duane Smith
*Assistant Examiner* — Minh-Chau Pham
(74) *Attorney, Agent, or Firm* — Edwin H. Crabtree; Ramon L. Pizarro

(57) ABSTRACT

A furnace filter box for mounting next to an intake air opening in a furnace. The filter box is adapted for receiving a furnace filter therein for filtering intake air. The filter box includes a front panel with a furnace filter door. The front panel is attached to sides of a first side panel and a second side panel. The first and second panels are attached to a back panel. A bottom panel is attached to a bottom portion of the front, back and first and second side panels. Mounted to an inside of an upper portion of the first and second side panels are filter rails. The filter rails are adapted for holding the furnace filter next to an open top in the filter box.

20 Claims, 4 Drawing Sheets

FURNACE FILTER BOX AND METHOD OF ASSEMBLY

BACKGROUND OF THE INVENTION (a) Field of the Invention

This invention relates to a furnace filter box, typically made of sheet metal, mounted under a furnace and positioned next to an air intake duct and a method of assembling and/or disassembling the filter box. The filter box is designed to be quickly assembled and cut to size while maintaining or increasing the strength of a front panel, a back panel and opposite side panels. The filter box can be easily shipped ready to assemble in a compact shipping box.

(b) Discussion of Prior Art

Furnace filter boxes made of sheet metal and manufactured in various sizes are well know in the art. The current invention overcomes deficiencies related to typical sheet metal filter boxes which are cut and formed to specific sizes creating handling, shipping, and safety issues for the manufacturer, distributor and installer. The spirit of the current invention addresses these deficiencies by creating an equivalent filter box, which can be up to or greater than one eighth the size, as strong or greater in overall strength, safer to handle and easier to install when compared to an equivalent counterpart.

The subject invention provides for shipping a disassembled furnace filter box to various remote locations for quick assembly on the job site, thus reducing labor cost and shipping expense.

SUMMARY OF THE INVENTION

In view of the foregoing, it is a primary objective of the subject invention to provide a compact, safe and easy to assemble furnace filter box that is adaptable to various sizes and types of air conditioning and heating furnaces.

Another object of the invention is the height of the assembled filter box can be reduced because of space restrictions and without compromising the strength of the unit.

Still another object of the invention is the furnace filter box can be shipped, preassembled in a small shipping box, to a remote location for assembly on a jobsite, thus reducing labor and transportation expense.

Yet another object of the furnace filter box is it is adapted for holding one or more different size and width of furnace filters for improving filtered intake air introduced into the furnace.

The subject furnace filter box includes a front panel with furnace filter door, a back panel, a first side panel and a second side panel. A bottom panel is attached to a bottom portion of the front, back and first and second side panels. Mounted to an inside of an upper portion of the first and second side panels are filter rails adapted for holding one or more furnace filters next to an open top in the filter box. Prior to the operation of the furnace filter box, a height of the front panel, back panel, and first and second side panels is cut to fit in a space provided under the air intake of the furnace. Also, an air intake opening is cut in either the first side panel, the second side panel or the back panel for attachment to an air intake duct for receiving outside air into the filter box and then into the furnace.

These and other objects of the present invention will become apparent to those familiar with the heating and air conditioning units and filter boxes used with the furnaces when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject furnace filter box, and in which.

DETAILED DESCRIPTION OF THE PREFERRED EMBODIMENTS

Figure 1:
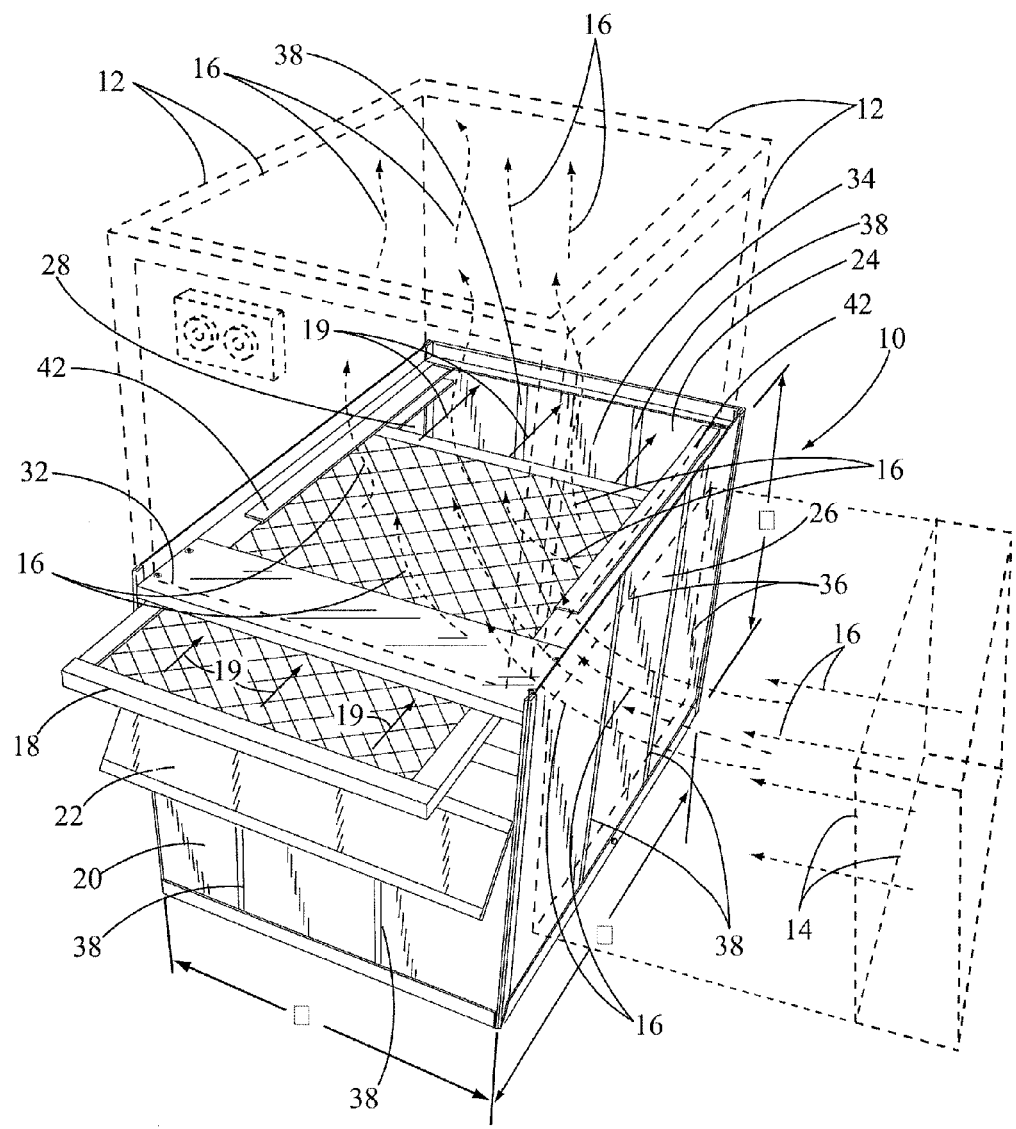
FIG. 1 is a perspective view of the subject invention with the furnace filter box completely assembled and disposed under an air intake in a lower portion of a furnace. The furnace is shown in dashed lines. A furnace filter is shown being installed in the top of the filter box. Also, a portion of an air intake duct, shown in dashed lines, is positioned for attachment to a first side panel.

In FIG. 1, a perspective view of the subject furnace filter box is shown, having general reference numeral 10 and completely assembled. The filter box 10 is disposed under an air intake in a lower portion of a furnace. The furnace is shown in dashed lines 12. Also, a portion of an air intake duct, shown in dashed lines 14, is positioned for attachment to a side of the filter box 10 for supplying intake air. The intake air is shown as arrows 16. The air 16 is received in the filter box 10 and circulated upwardly through a furnace filter 18, shown being slid inside the box, indicated by arrows 19. The intake air 16 then moves upwardly into the bottom of the furnace 12.

Figure 2:
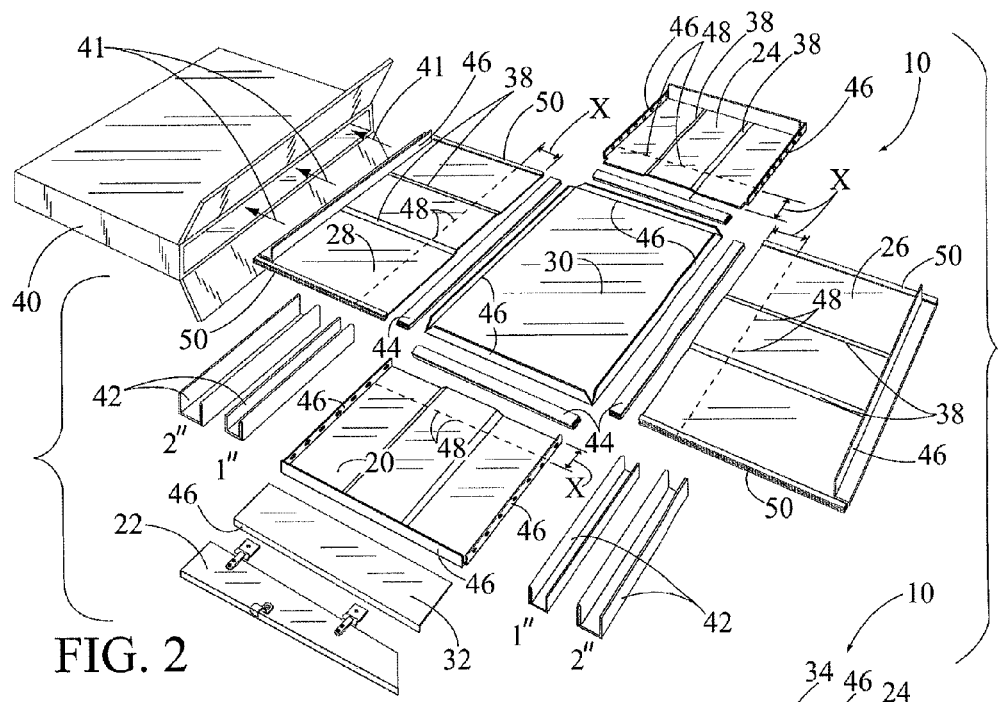
FIG. 2 illustrates the furnace filter box disassembled and prior to being placed in a shipping box or taken out of the shipping box and ready to be assembled on a jobsite.
Figure 7:
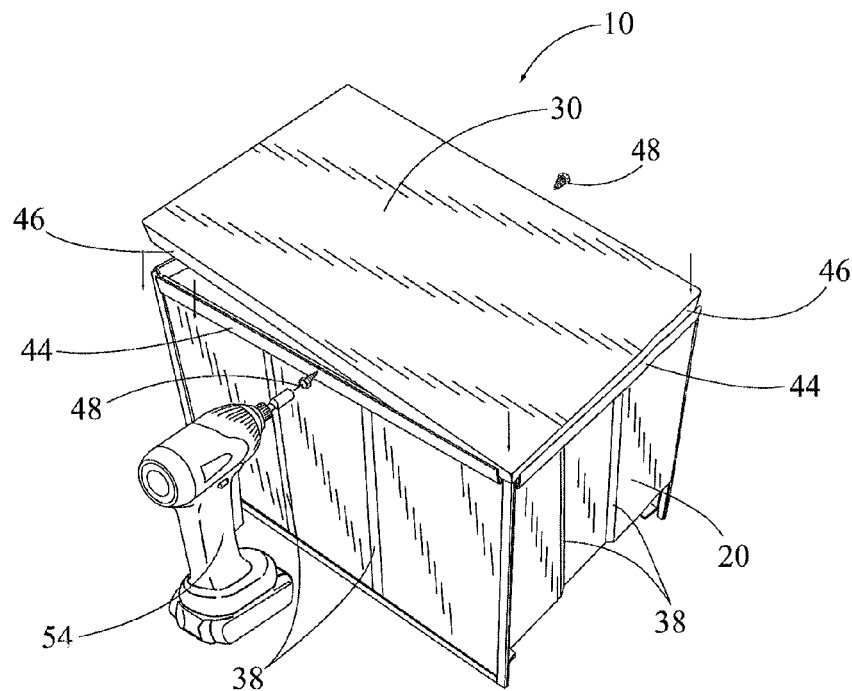
FIG. 7 is a perspective view, similar to FIG. 6, showing a bottom panel having flanges used for receipt in the S-lock channels attached to a bottom portion of the front, back, and side panels and secured thereto using metal screws.
Figure 8:
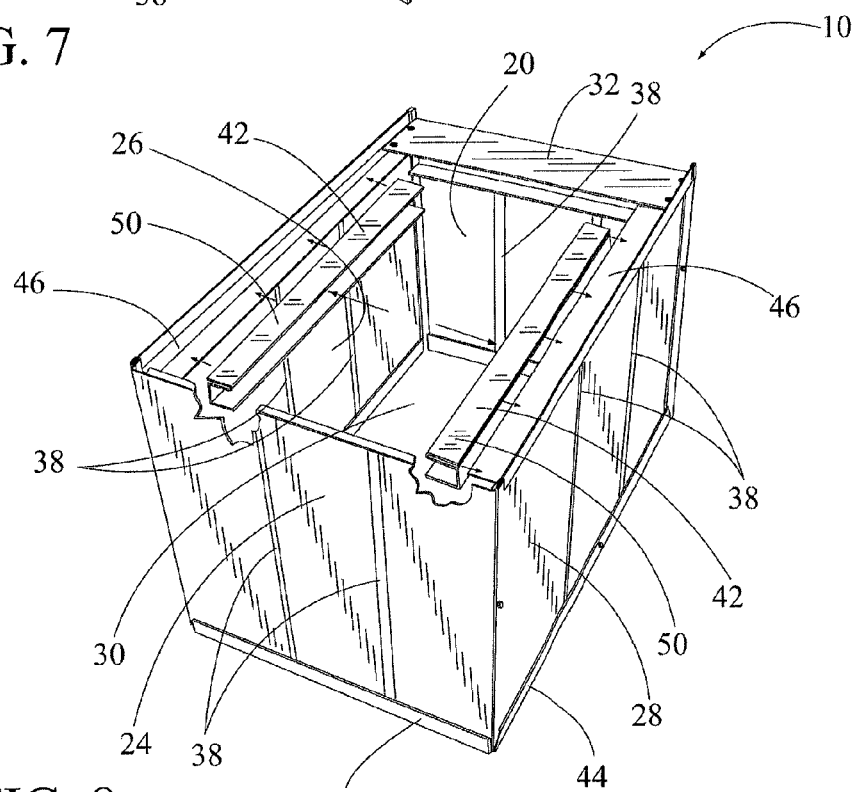
FIG. 8 is a perspective view of the filter box, similar to FIG. 4, illustrating furnace filter guides having "U" shaped flanges used for attachment to flanges in a top portion of the first and second panels.

Broadly, the furnace filter box 10 includes a front panel 20 with a furnace filter door 22 hinged thereon, a back panel 24, a first side panel 26, a second side panel 28, a bottom panel 30, and a top panel 32 disposed next to an enlarged open top 34. The open top 34 is used for circulating the filter air 16 into the bottom of the furnace. The bottom panel 30 is shown in FIGS. 2, 7 and 8.

The panels mentioned above are used in the construction of the furnace filter box 10 and are typically made of thin sheet metal. In the alternative, the panels can be made of thin sheet plastic or a similar sheet material.

During the assembly of the filter box 10, an air intake opening, shown in dashed lines 36, is cut into the first side panel 26 for receiving an end of the air intake duct 14. Also the air intake opening 36 can be cut in the second side panel 28 or the back panel 24 depending on the location of the air intake duct 14. When the furnace filter 18 is properly seated inside the filter box 10 and covering the open top 34 and the furnace filter door 22 is closed, the furnace 12 is ready to be turned "on". At this time, the intake air 16 is received through the air intake duct 14, received inside the filter box 10, circulated upwardly through the furnace filter 18 and then into the bottom of the furnace 12.

In this drawing, the furnace filter box 10 is shown having a width "W", in a range of 14 to 26 inches, a length "L" in a range of 26 to 30 inches, and a height "H" in a range of 16 to 20 inches.

It should be noted, the front panel 20, the back panel 24 and the first and second panels 26 and 28 include spaced apart, vertical strength ribs 38. These ribs 38 are important to maintain an overall strength of the filter box 10, particularly if the panels are cut to reduce the height "H" of the panels and to reduce potential air vibration in the filter box. Heretofore, prior art sheet metal panels used in filter boxes included an "X" shaped reinforcing rib. When the height of the panels was reduced during the assembly of the filter box, the strength of "X" shaped reinforcing ribs was reduced and vibration, due to air flow, increased during the operation of the furnace.

Figure 6:
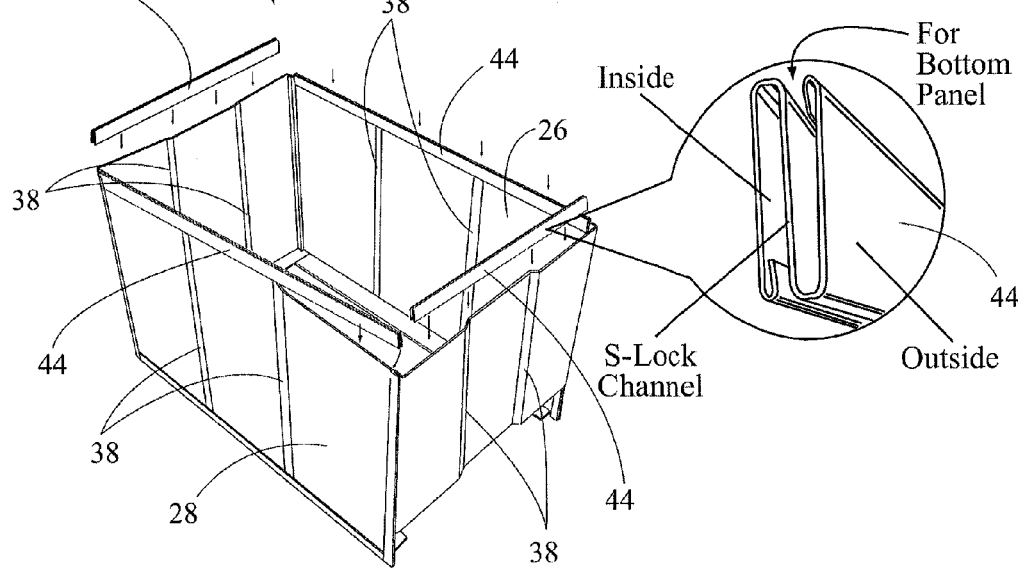
FIG. 6 is a perspective view of the filter box turned upside down and illustrating S-lock channels positioned for attaching to the front, back and side panels.

In FIG. 2, the furnace filter box 10 is shown disassembled and prior to being received inside a shipping box 40, as indicated by arrows 41, and mailed to a remote location for assembly. Also, this drawing can represent the filter box 10 being taken out of the shipping box 40 and ready to be assembled on a jobsite as shown in the drawings. In this drawing, the vertical reinforcing ribs 38 can be seen clearly incorporated into the front, back and side panels. Further shown in the drawing are two pairs of "U" shaped furnace filter rails 42. The "U" shaped, furnace filter rails 42 have a width of 1 inch and 2 inches and greater for receiving different widths of furnace filters 18. Still further, four S-lock channels 44 are shown for attaching to right angle flanges 46 on the sides of the bottom panel 30. The channels 44 are used for securing the bottom of the front panel 20, back panel 24 and first and second side panels 26 and 28 to the bottom panel 30, as shown in FIGS. 6 and 7. The front panel 20, the back panel 24 and the first and second side panels 26 and 28 also include right angle flanges 46 used in the assembly of the filter box 10

Also shown in this drawing are dashed lines 48 along a bottom portion of the front panel 20. The back panel 24, and first and second panels 26 and 28. A distance "X" is shown between the bottom of the panels and the dashed lines 48. The distance "X" can be ½, 1, 2, etc. inches, which is an amount cut to reduce the height of the panels for receiving the furnace filter box 10 under the furnace 12. Also at this time, the position of the air intake duct 14 is measured in relationship to a panel, for example the first panel 26, and the air intake duct opening 36 is cut therein.

Figures 3, 4:
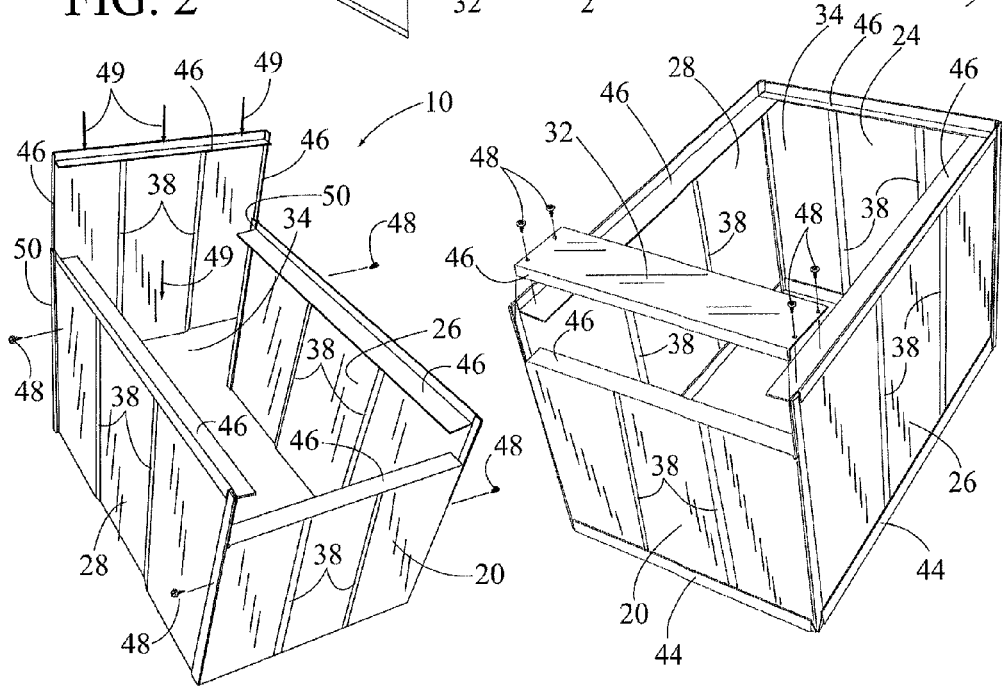
FIG. 3 illustrates a perspective view of the filter box partially assembled with a first and a second side panel attached to a front panel. A back panel is shown be slidably attached to the first and second side panels.
FIG. 4 is another perspective view of the filter box with a top panel being attached to the side panels and next to an enlarged open top in the filter box.

In FIG. 3, the start of the method of assembly of the filter box 10 is shown. In this drawing, a perspective view of the filter box 10 is illustrated partially assembled with the first and second side panels 26 and 28 attached to the front panel 20, using metal screws 48 attached to the right angle flanges 46 along the sides of the front side panel 20. A back panel 24 is shown having right angle flanges 46 slidably received, as indicated by arrows 49, in "U" shaped flanges 50 along the sides of the first and second panels 26 and 28.

In FIG. 4, another perspective view of the filter box 10 is illustrated with the top panel 32 being attached to the side panels 26 and 28 using screws 48 and next to the enlarged open top 34 in the filter box 10. Also shown in the drawing are S-lock channels 44 received on the bottom of the front panel 20, the back panel 24, and the first and second side panels 26 and 28.

Figure 5:
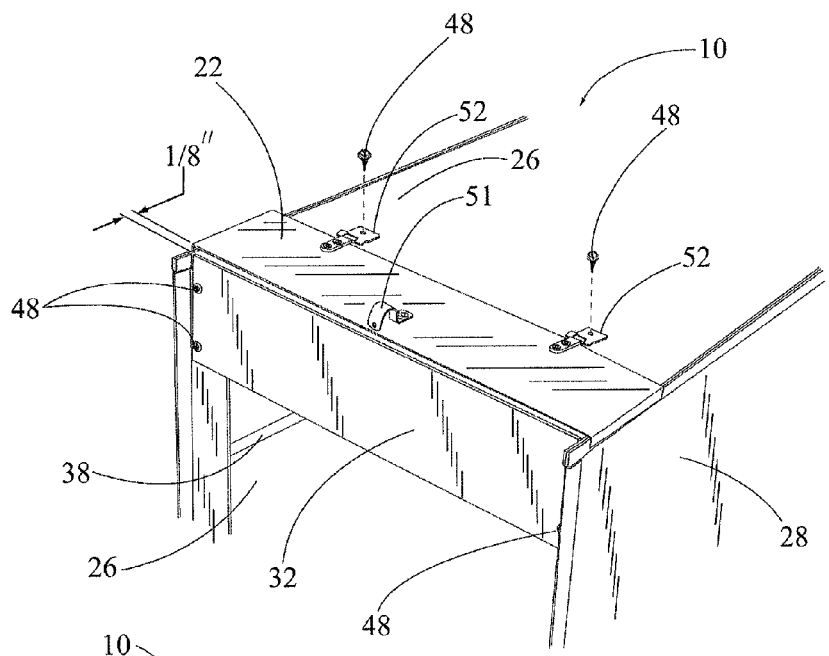
FIG. 5 is a partial perspective view of the filter box and illustrating an attachment of a hinged furnace filter door in a top portion of the front panel.

In FIG. 5, a partial perspective view of the filter box 10 is shown illustrating an attachment of the furnace filter door 22, with a handle 51, attached to a top portion of the front panel 20 using hinges 52. The top of the door 22 is spaced ⅛ inch from the top panel 32 to prevent contact during the opening and closing of the door when changing furnace filters 18 in the filter box 10.

In FIG. 6, a perspective view of the filter box 10 is shown turned upside down for illustrating the mounting of the S-lock channels 44 on the bottom of the front, back and side panels.

In FIG. 7, a perspective view, similar to FIG. 6, is shown with the right angle flanges 46 of the bottom panel 30 received in a portion of the S-lock channels 44 and secured thereto using the metal screws 48. In this drawing, a battery powered screw driver 54 is shown and used for securing the metal screws 48 to the panels when assembling the filter box 10.

In FIG. 8, a perspective view of the filter box 10 is shown, similar to FIG. 4, and illustrating the attachment of the furnace filter guides 42 having "U" shaped flanges 50. The "U" shaped flanges 50 are inserted into the right angle flanges 46 in the top of the first and second side panels 26 and 28. The filter box 10 has now been assembled, as shown in FIG. 1, and ready for installing under the furnace 12 and inserting a selected furnace filter 18 on the furnace filter guides 42. Also, the end of the air intake duct 14 is received in the air intake duct opening 36.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A furnace filter box adapted for mounting next to an intake air opening in a furnace, the filter box disposed under an air intake opening in a lower portion of a furnace, the filter box adapted for receiving at least one furnace filter therein for filtering intake air received from an air intake duct, the filter box comprising:
   a vertical front panel with a furnace filter door, the front panel attached to vertical sides of a first side panel and a second side panel, the first and second panels attached to a vertical back panel, a horizontal bottom panel is attached to a bottom portion of the front, the back and first and second side panels;
   a pair of horizontal furnace filter rails mounted to an inside of an upper portion of the first and second side panels, the filter rails adapted for holding the furnace filter next to an enlarged open top in the filter box and covering the open top; and
   a vertical air intake opening in the first side panel, the air intake opening adapted for receiving an end of the air intake duct.

2. The filter box as described in claim 1 wherein the air filter rails are "U" shaped, air filter rails having a width of 1 inch and greater for receiving different widths of furnace filters.

3. The filter box as described in claim 1 wherein the furnace filter door is hinged to a top of the front panel, the furnace filter door disposed next to an end of the furnace filter rails.

4. The filter box as described in claim 1 further including a top panel attached to a portion of a top of the first and second side panels, the top panel disposed next to an enlarged open top in the filter box.

5. The filter box as described in claim 1 further including a plurality of S-lock channels used for attaching the bottom panel to a bottom of the front, the back and the first and second side panels.

6. The filter box as described in claim 1 wherein the upper portion of the first and second side panels include right angle flanges, the right angle flanges received in "U" shaped flanges on the furnace filter rails, when the filter rails are mounted thereon.

7. The filter box as described in claim 1 wherein the front, the back and the first and second side panels include spaced apart, vertical strength ribs formed therein for adding strength to the filter box.

8. The filter box as described in claim 1 wherein sides of the front and the back panels include right angle flanges, the right angle flanges received in "U" shaped flanges in the sides of the first and second side panels for securing the front and the back panels to the first and second side panels.

9. The filter box as described in claim 1 wherein the upper portion of the front and the back panels include right angle flanges in the top thereof.

10. A furnace filter box adapted for mounting next to an intake air opening in a furnace, the filter box disposed under an air intake in a lower portion of a furnace, the filter box adapted for receiving at least one furnace filter therein for filtering intake air received from an air intake duct, the filter box comprising:
    a vertical front panel with a furnace filter door, the front panel attached to sides of a vertical first side panel and a vertical second side panel, the first and second panels attached to a vertical back panel, a horizontal bottom panel is attached to a bottom portion of the front, the back and first and second side panels, the front, the back and the first and second side panels includes spaced apart vertical strength ribs formed therein for adding strength to the filter box;
    a pair of "U" shaped horizontal furnace filter rails mounted to an inside of an upper portion of the first and second side panels, the filter rails having a width of 1 inch and greater for receiving different widths of furnace filters, the filter rails adapted for holding the furnace filter next to an enlarged open top in the filter box and covering the open top; and
    a vertical air intake opening in the first side panel, the air intake opening adapted for receiving an end of the air intake duct.

11. The filter box as described in claim 10 wherein the furnace filter door is hinged to a top of the front panel, the furnace filter door disposed next to an end of the furnace filter rails, whereby when the filter door is opened, the furnace filter can be inserted inside the filter box or removed from inside the filter box.

12. The filter box as described in claim 10 further including a top panel attached to a portion of a top of the first and second side panels, the top panel disposed next to the enlarged open top in the filter box, the top panel having a downwardly extending right angle flange disposed next to a top of the furnace filter door.

13. The filter box as described in claim 10 further including a plurality of S-lock channels mounted on right angle flanges disposed around sides of the bottom panel, the S-lock channels used for attaching the bottom panel to a bottom of the front, the back and the first and second side panels.

14. The filter box as described in claim 10 wherein the upper portion of the first and second side panels include right angle flanges, the right angle flanges received in "U" shaped flanges on the furnace filter rails, when the filter rails are mounted thereon.

15. The filter box as described in claim 10 wherein sides of the front and the back panels include right angle flanges, the right angle flanges received in "U" shaped flanges in the sides of the first and second side panels for securing the front and the back panels to the first and second side panels.

16. The filter box as described in claim 10 wherein the upper portion of the front and the back panels include right angle flanges in the top thereof.

17. A method of assembling a furnace filter box, the filter box adapted for mounting next to an intake air opening in a furnace, the filter box adapted for receiving at least one furnace filter therein for filtering intake air received from an air intake duct, the steps including:
    attaching sides of a front panel with a furnace filter door to sides of a first side panel and a second side panel;
    attaching the sides of the first and second panels to sides of a back panel;
    attaching sides of a bottom panel to a bottom portion of the front, the back and first and second side panels,
    mounting a pair of "U" shaped furnace filter rails to an inside of an upper portion of the first and second side panels, the filter rails having a width of 1 inch and greater for receiving different widths of furnace filters, the filter rails adapted for holding the furnace filter next to an enlarged open top in the filter box and covering the open top;
    cutting an air intake opening in the first side panel, the air intake opening adapted for receiving an end of the air intake duct; and
    mounting the assembled furnace filter box next to the intake air opening in the furnace.

18. The method as described in claim 17 further including a step of attaching a top panel to a portion of a top of the first and second side panels, the top panel disposed next to an enlarged open top in the filter box.

19. The method as described in claim 17 further including a step of forming spaced apart, vertical strength ribs in the front, the back and the first and second side panels prior to attaching the sides of the front panel to the sides of the first and second side panels.

20. The method as described in claim 17 further including a step of attaching S-lock channels to right angle flanges on sides of the bottom panel and attaching the S-lock channels to a bottom of the front, back and first and second side panels.

\* \* \* \* \*